United States Patent Office 2,925,197
Patented Feb. 16, 1960

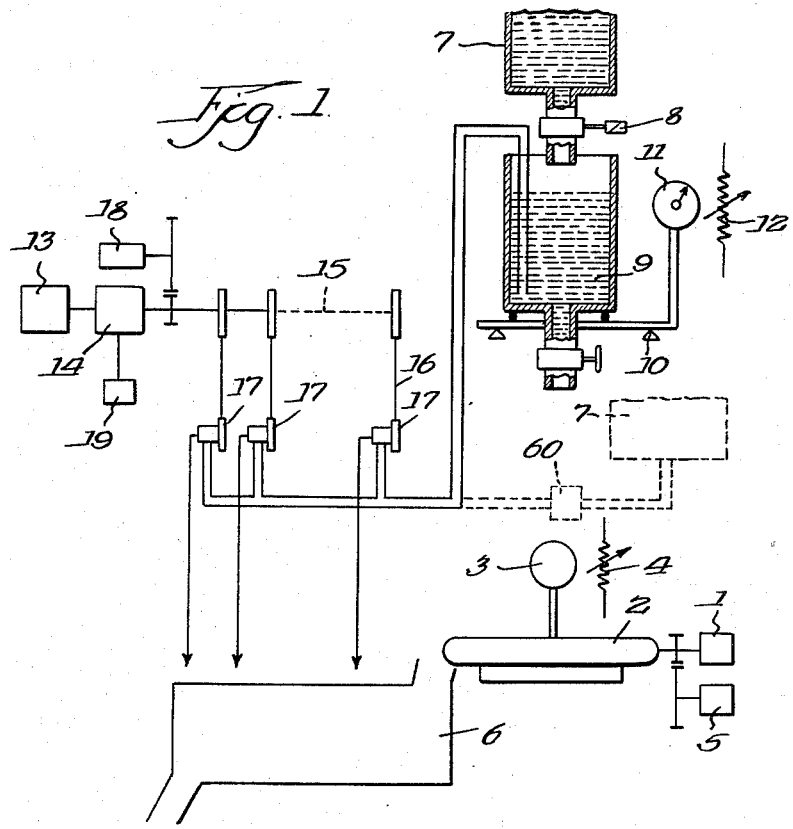
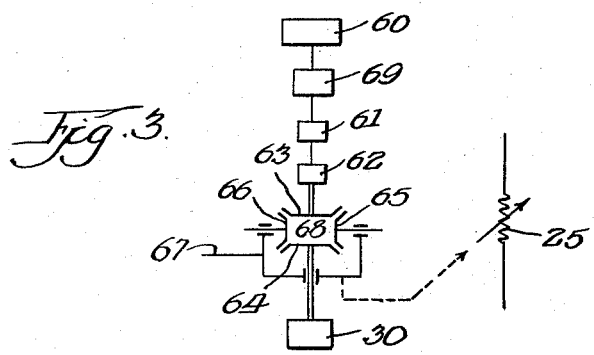

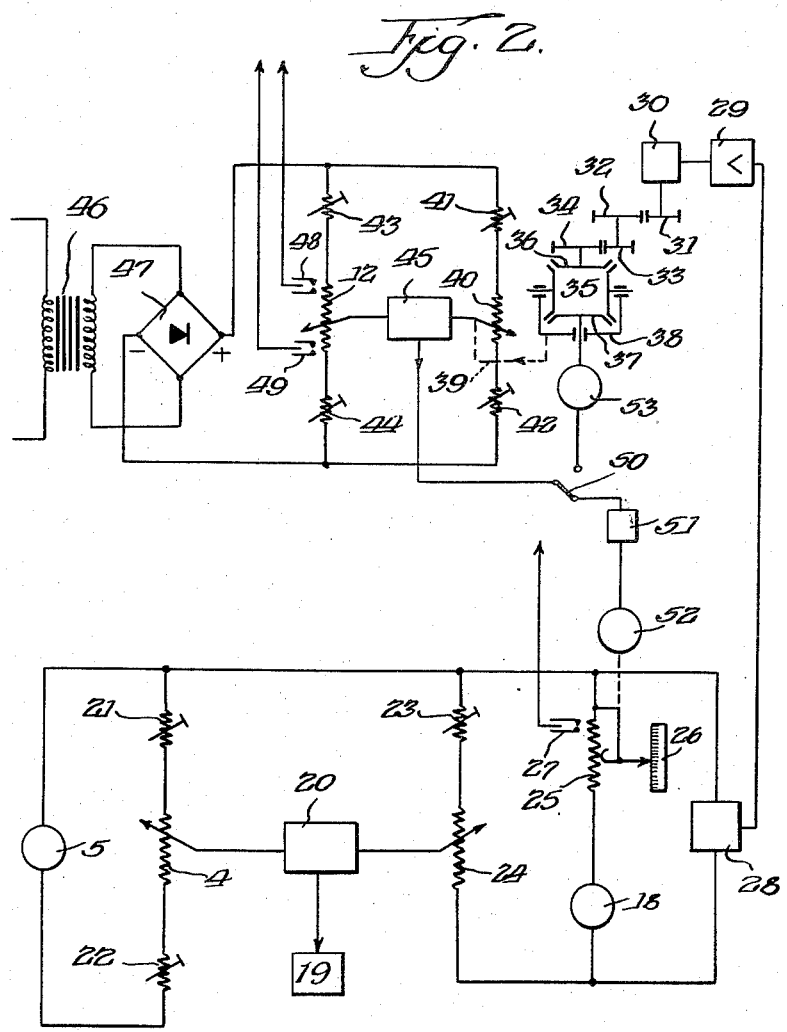

2,925,197

METHOD OF AND APPARATUS FOR FEEDING LIQUID TO FLOWING MATERIAL

Kurt Frebel, Darmstadt, Germany, assignor to Carl Schenck Maschinenfabrik G.m.b.H., Darmstadt, Germany, a corporation of Germany Application October 3, 1956, Serial No. 613,714

14 Claims. (Cl. 222—1)

The present invention relates to a system and apparatus for regulating the supply of quantities of liquid to a flowing material which is to be wetted by it and which is conducted, preferably continuously, through the supply station. The material may be, in particular, of organic origin, such as wood fibers or shavings or synthetic fibers, from which, after wetting with liquid binders, boards or other molded bodies are made, requiring the quantity of liquid added to be in a definite relationship to the material flowing through the supply station.

In known plants for the production of organic fiberboards or chipboards, the station for the addition of the binder generally has one or more binder pumps which are regulated either manually or automatically as a function of the indication of a gravometric fiber measuring station. A disadvantage of the known binder pumps which spray the binder or glue over the chips is that the quantity of binder supplied experiences changes, even with a constant speed of rotation of the pumps, which may be due, inter alia, to a change of the viscosity of the binder, to inclusions of air bubbles in varying quantities in the liquid binder and to the constantly changing degree to which the pumps, nozzles or lines are clogged.

In order to obtain molded fiber bodies of constant quality, it must be made certain that a constant adjustable percentage of binder is added to each unit quantity of chips which passes through the mixer.

The general problem of an accurate proper regulation of the addition of the quantities of liquid to a flow of material, illustrated by the preceding specific example, is solved by the present invention by regulating the quantity of liquid required, by comparison of an electric voltage, which is proportional to the weight of the quantity of material passing through the measuring station, with an electric voltage which is proportional to the correct quantity of liquid which must be added.

The invention produces the voltage which is proportional to the correct quantity of liquid to be added by a tachometer machine rotating at a speed proportional to the speed of rotation of the drive of the pumps supplying the quantities of feed liquid to the material in combination with a rheostat, the setting of which depends on the ratio of the quantity (for instance of a liquid binder) which is actually added per unit time to the correct quantity (liquid quantity feed factor). In accordance with one feature of the invention, the feed liquid may be fed to the feed pumps from a feed vessel connected with a weighing device, the vessel being completely emptied in a period of time which is dependent inter alia on the output of the feed pumps. After the emptying, refilling takes place from a feed liquid storage container, for instance by the opening of a magnetically-controlled valve. The rheostat, the setting of which depends on the liquid quantity feed factor, is continuously reset as a function of the indication or position of the weighing device of the feed vessel in such a manner that the voltage produced at the series connection of this rheostat with the tachometer machine, which is proportional to the speed of rotation of the feed pump, is proportional to the desired quantity by weight of the feed liquid.

The foregoing and further objects and features of the invention will appear from the description which will be rendered below with reference to the accompanying drawings showing examples of gravimetric and volumetric distributing controls for regulating the supply of a liquid, for example, a binder, in the production of wood-chipboards. In the drawings, Fig. 1 is a general view of part of a wood-chipboard manufacturing plant in which the method according to the invention is employed;

Fig. 2 is a schematic control circuit for this part of the plant; and

Fig. 3 is a block diagram of another embodiment according to the invention.

The wood chips coming from a drying station (not shown in the drawing) pass to the weighing station 2 (Fig. 1) which is preferably a belt-balance. To the shaft of the belt-drive motor 1, there is coupled a tachometer machine 5 which supplies a direct voltage required for the measuring circuit which will be presently described. The device 3 of the weighing balance 2 comprises the corresponding scale, the scale indicator and the gear therefor, and may be referred to as the balance head. This device (balance head) controls the center tap of a voltage divider 4, by known coupling means connecting the scale indicator with the tap, the tap thus following the deflections of the indicator. The purpose and operation of this control will be presently described, this control being effected in well known manner and has therefore not been shown in the drawing.

After leaving the weighing station, the chips pass into the binder feed station 6, in which their impregnation with the binder takes place as a result of intensive mixing.

A binder vessel 9 is intermittently filled from a binder supply container 7. The opening and shutting off of the feeding of the binder is effected by a magnetic valve 8. The binder vessel 9 rests on a balance 10, the balance head 11 of which actuates the central tap of the voltage divider 12 in a similar manner as the balance head 3 controls the central tap of the voltage divider 4. The binder flows from the binder vessel 9 directly to the pumps 17 by means of which it is sprayed in the desired manner over the wood chips in the binder feed station 6.

The binder pumps 17 are driven by suitable belt or chain drives 16 via a common shaft 15 to which the pump drive motor 13 is coupled via a variable transmission, for instance a hydraulic transmission 14.

The transmission ratio of the hydraulic transmission 14 may be varied by means of the adjusting motor 19. The speed of rotation is tapped off by a tachometer machine 18 the purpose of which will be presently described more in detail. The regulating of the adjusting motor 19, which assures a uniform supply of binder for the wood chips, is effected by means of the control circuit shown in Fig. 2.

The zero balancing apparatus 20 (this is an apparatus known per se, which gives off power at its secondary winding even in case of small differences in direct voltage at its input terminals) controls the adjusting motor 19 by the comparison of two voltages, one of which is tapped from the voltage divider 4. The voltage divider 4 is disposed in series with the two balancing resistors 21 and 22 of the tachometer machine 5 and its center tap, as already mentioned, is displaced as a function of the deflections of the balance head of the material weighing station 2. The other one of the two comparison voltages is tapped from a voltage divider 24 by means of which a given desired proportion by weight of binder with respect to the weight of the chips can be set and which advantageously is calibrated directly in percentage of weight of binder to weight of chips. In series with this voltage divider, there is another balancing resistor 23. The comparison voltage is produced by the tachometer machine 18 lying in series with this resistor 23 and voltage divider 24, there being furthermore located in series with the tachometer machine 18 a rheostat 25, the control of which, as a function of the liquid quantity feed factor is described more in detail below.

The position of the rheostat 25 is indicated by a scale 26 which is preferably calibrated in the ratios of the feed factor. From the scale 26, the instantaneous state of feed of the liquid regulation may be continuously observed, the scale indicating the setting of the rheostat and, accordingly, the state of feed, for instance, when a nozzle is clogged, or whether the interposed filters are clean, etc. In parallel to the series connection of the tachometer machine 18 and the rheostat 25, there is also a D.C. meter 28 which has a suitable pulse generating device. There is preferably employed an optical device with photoelectric cell by which one pulse is produced upon each rotation of the meter disc.

The pulse frequency, which is proportional to the voltage on the meter, is amplified in an amplifier 29 and is converted into rotary motion by means of the rotary stroke magnet 30. This rotary motion is transmitted, with the interposition of the gears 31, 32, 33, 34 to the sunwheel 36 of a mechanical differential transmission 35. From the differential cage 38, transmission of the mechanical motion is effected via suitable transmission device 39 to the central tap of the voltage divider 40.

Instead of the direct current meter 28, there may also be employed, in accordance with the invention, a measuring motor (not shown) which supplies a rotary motion which is proportional to the voltage and which may directly drive gear 31. The voltage divider 40, in series with two balancing resistors 41 and 42, is under a constant D.C. voltage which is produced, via a rectifier 47, by a transformer 46 connected with the mains of a commercial current source. The voltage divider 12, is also in series with two balancing resistors 43, 44, under the same comparison voltage, the center tap of the voltage divider 12 being controlled via the balance head 11 of the binder weighing balance 10 (Fig. 1) by the instantaneous weight of the binder vessel 9. The zero balancing apparatus 45 compares the voltages at the center taps of voltage divider 12 and voltage divider 40 and controls the motor 52 which effects the adjustment of the rheostat 25 which is dependent on the liquid quantity feed factor.

The manner of operation of this system is as follows:

First of all, the desired binder percentage is set on the voltage divider 24, the binder vessel 9 is filled until the center tap of voltage divider 12 connected with balance head 11 moves into the topmost end position. In this position, it closes a contact 48 which closes a circuit to light a pilot lamp indicating that the binder vessel 9 is full.

Thereupon both the belt-scale drive motor 1 and the binder pump drive motor 13 are placed in operation and the gluing commences at station 6. If the quantity of binder delivered is greater or less than in accordance with the correct value set at the voltage divider 24, a corresponding change in the speed of rotation of the binder pumps 17 is effected by regulation via the zero balancing apparatus 20. A change in the viscosity of the binder will accordingly be compensated by a change in the setting of the rheostat 25 lying in the comparison voltage circuit, the zero balancing apparatus 45 cooperating in the setting of the rheostat by controlling the motor 52. The apparatus thus effects continuous comparison between the actual rate of descent of the binder in vessel 9 and theoretical rate of descent which latter is produced by the tachometer machine 18 which depends on the speed of rotation of the pumps, in combination with the rheostat 25 and the above-described subsequent circuit members 28—39, as voltage on the voltage divider 40.

In order to avoid hunting of this regulating system, the zero balancing apparatus 45 does not act continuously on the adjusting motor 52 for the resistor 25, but rather acts briefly intermittently at given adjustable time intervals. For this purpose, there is connected between the zero balancing device 45 and the adjusting motor 52 a periodic timing member 51, known per se, which, for instance, is so adjusted that every minute it makes contact for one second while the rest of the time it opens the connection.

In order further to explain the manner of operation of the arrangement, let us take as example an increasing degree of clogging of the pumps 17. The binder added will be lessened and accordingly, the downward motion of the center tap at the voltage divider 12 will be slowed. The zero balancing instrument 45 which thereby becomes unbalanced displaces the rheostat 25, via the periodic timing member 51 and the motor 52, in such a manner that the resistance is increased. As a result of this, the voltage drop at the rheostat 25 increases so that the voltage at the resistor 24 drops and the zero balancing apparatus 20 is consequently unbalanced. The zero balancing apparatus 20 now varies the speed of rotation of the motor 18 of the binder pumps 17 until the previous voltage value is again present at the resistor 24 and thus also at the meter 28.

The rate of descent at the potentiometer 40 has in this case remained unchanged. The periodic timing member 51 interrupts the connection between the zero balancing instrument 45 and the motor 52 after a short time and restores it after, for instance, a minute, as a result of which, the zero instrument 45 imparts the motor 52 another correction pulse. This operation continues until the same potentials are present at the center taps of the voltage dividers 12 and 40.

If a complete interruption of the flow of binder takes place, for instance due to a clogging of one of the lines, the center tap of the resistor 12 can no longer move further downwards and there will be a voltage difference at the zero balancing apparatus 45, as a result of which the rheostat 25 will be moved further and further until its control tap at its outermost end actuates a contact 27, thus giving off an alarm signal.

If the binder vessel 9 has been emptied down to a given level, the center tap of the voltage divider 12 closes a contact 49, and a control circuit (not shown) is closed, as a result of which, first of all, a signal is given off and secondly, the magnetic valve 8 is opened so that the binder vessel 9 is again filled from the binder supply container 7, whereby, thirdly, a switch 50 is actuated which connects the zero balancing instrument 45 on the secondary side with the adjusting motor 53 which acts on the sunwheel 37 of the differential 35, whereby the center tap of the voltage divider 40 is again moved upward.

With the filling of the binder vessel 9, the center tap of the voltage divider 12 simultaneously again moves upward until in its uppermost position the contact 48 is closed. The closing of this contact terminates the filling process, that is, it causes the magnetic valve 8 to close again and the switch 50 to be placed in its operating position.

During the short period of time in which the binder vessel 9 is automatically filled, the pumps continue to operate with the last corrected value of the feed factor. When the filling has been completed, the automatic switching takes place only after a short time of rest (about 2 seconds) during which the motor 53 is displaced by the zero balancing apparatus 45 until practically no further current flows through the zero balancing apparatus 45, that is until the bridge is balanced.

This operation provides for an automatic tare equalization. It is unimportant whether the binder vessel 9 is entirely emptied or not entirely filled. By the switching of the switch 50, independence from the tare is assured. By a suitable setting of the resistors 42 and 44, the vessel can for instance be refilled after it has become three-quarters empty or by the setting of the resistors 41 and 43, the result can be obtained that the vessel is at all times filled only to the extent of three-quarters.

If liquids which have a variable weight per liter and are thinly liquid are metered over pumps which do not feed uniformly, the scale can be replaced by a pressure cell which drives the voltage divider 12 as a function of the decrease of the pressure on the bottom in the vessel 9.

In case of liquids having a constant specific weight (for instance water), the voltage divider 12 may be controlled by a float.

In accordance with another embodiment of the invention, the feed liquid supplied to the feed liquid pumps may also be determined by means of a preferably particularly exact quantity meter and the value resulting therefrom may be simultaneously converted into the magnitude necessary for the further regulation. The feed vessel 9 is thereby dispensed with and the quantity meter 60 is located, as shown in dotted lines in Fig. 1, in a directly connecting line between the feed supply container 7 and the feed pumps 17. The quantity meter 60 may be used in this case for controlling the voltage divider 12.

In accordance with another feature of the invention, however, it is also possible, dispensing with the zero balancing apparatus 45, to effect the comparison necessary for the control, in an entirely mechanical manner, for instance by means of a differential gearing. The movements of the rotary impact magnet 30 are in this case—as shown in Fig. 3—transmitted to the sunwheel 64 of a differential gearing 68, if necessary with the interposition of a reduction gearing. The movement of the quantity meter 60 is transmitted to the opposite sunwheel 63, if necessary, by the interposition of a pulse generator 69, an amplifier 61 and a rotary stroke magnet 62. The difference motion is transmitted via the planet wheels 65 and 66 to the differential cage 67 which adjusts the rheostat 25 by a drive device indicated in dotted line, causing an increase in the voltage drop at the rheostat 25 and, accordingly, reduced potential at the voltage divider 24 shown in Fig. 2. As a consequence, the zero balancing device 20 is unbalanced and the speed of rotation of the binder supply pumps 17 is gradually increased until the former voltage value is at the voltage divider 24 and therewith also at the meter 28.

Changes may be made within the scope and spirit of the appended claims.

I claim:

1. In a system requiring the addition of binder liquid at a binder supply station, to material flowing past said supply station, apparatus for regulating the addition of said binder liquid comprising means for controlling the amount of binder liquid required to be added by comparison of an electric voltage which is proportional to the amount of material passing said supply station with an electric voltage which is proportional to the predetermined desired amount of binder liquid to be added, said apparatus comprising pump means for delivering binder liquid to said station and drive means for said pump means, a tachometer device for producing the voltage proportional to the desired amount of binder liquid to be added, said tachometer rotating proportionally to the speed of rotation of the drive means for said pump means, and rheostat means set in accordance with the ratio of the desired amount of binder liquid to be added per unit of time cooperatively connected with said tachometer device.

2. Apparatus according to claim 1, comprising a feed vessel for supplying said liquid binder to said station, a measuring device for continuously establishing the amount of binder liquid in said vessel, said pump means drawing binder liquid from said vessel.

3. Apparatus according to claim 2, comprising series circuit means between said tachometer device and said rheostat, means for continuously resetting said rheostat under control of said measuring device, and means governed by said resetting for producing in said series circuit a voltage which is proportional to the speed of rotation of said pump means and proportional to the desired amount of binder liquid to be added.

4. Apparatus according to claim 3, comprising a direct current meter disposed in series with said tachometer device, said meter producing impulses at a frequency proportional to its terminal voltage, a rotary stroke magnet for converting said impulses into rotary motion, a voltage divider connected to constant voltage, means for shifting the center tap of said voltage divider under control of said rotary stroke magnet, a second voltage divider connected to the identical voltage, means for displacing the center tap of said second voltage divider as a function of the amount of liquid in said vessel ascertained by said measuring device, an auxiliary motor, a zero balancing circuit disposed between the center taps of said voltage dividers for controlling the operation of said auxiliary motor, and means governed by said auxiliary motor for controlling the operation of the drive for said pump means.

5. Apparatus according to claim 4, comprising a measuring motor for governing said drive means.

6. Apparatus according to claim 4, comprising a timing device for intermittently operating said auxiliary motor.

7. Apparatus according to claim 4, comprising contact means governed by said center tap of said voltage divider which is governed as a function of the amount of binder liquid in said vessel for governing circuit means controlling supply of binder liquid into said vessel to replenish liquid therein.

8. Apparatus according to claim 4, comprising a quantity meter for controlling the operation of said zero balancing device.

9. In a system requiring the addition of binder liquid, at a binder supply station, to material flowing past said supply station, a method of regulating the addition of said binder liquid, said method comprising, producing a first electric voltage as a criterion of the amount of material flowing past said supply station, producing a second electric voltage as a criterion of the desired amount of liquid to be added to said material, producing a third electric voltage as a criterion of the amount of liquid actually being added to said material, producing a fourth electric voltage as a criterion of the rate at which said liquid is being added to said material, comparing said first and said second voltages to produce a first regulation voltage for controlling the apportioning of the liquid being added to said material, and comparing said third and fourth voltages to produce a second regulation voltage for controlling the magnitude of the voltage corresponding to said second voltage for the purpose of governing the magnitude of said first regulation voltage.

10. In a system requiring the addition of binder liquid, at a binder supply station, to material flowing past said supply station, apparatus for regulating the addition of said binder liquid comprising first means for producing a first electric voltage as a criterion of the amount of material flowing past said supply station, second means for producing a second electric voltage as a criterion of the desired amount of liquid to be added to said material, third means for producing a third electric voltage as a criterion of the amount of liquid actually being added to said material, fourth means for producing a fourth electric voltage as a criterion of the rate at which said liquid is being added to said material, means for comparing said first and said second voltages to produce a first regulation voltage for controlling the apportioning of the liquid being added to said material, and means for comparing said third and fourth voltages to produce a second regulation voltage for controlling the magnitude of the voltage corresponding to said second voltage for the purpose of governing the magnitude of said first regulation voltage.

11. A system and apparatus according to claim 22, comprising a vessel containing said liquid and pump means for drawing from said vessel liquid to be added to said material, a tachometer for ascertaining the rate of rotation of said pump means, regulator means controlled by the rate of supply of said liquid by said pump means, a current measuring instrument disposed in series circuit relationship with said tachometer for producing impulses at a frequency proportional to its terminal voltage, a rotary stroke magnet for converting said impulses into rotary motion, a device for controlling said rotary motion, a first voltage divider connected to a substantially constant voltage, the tap of said voltage divider being during the emptying of said vessel moved from one to another terminal position under control of said device, a second voltage divider connected to said constant voltage, the tap of said second voltage divider being during the emptying of said vessel moved from one to another terminal position as a function of the diminishing weight of said vessel as a consequence of progressive emptying thereof, a control device connected with the taps of said voltage dividers, a motor governed by said control device for adjusting said regulator means responsive to a voltage difference at said voltage dividers, a third voltage divider disposed in circuit with said regulator means, the tap of said third voltage divider being preset to a predetermined voltage ratio, a fourth voltage divider having a tap which is adjusted as a function of the amount of material flowing past said supply station, and a further control device connected with the taps of said third and fourth voltage dividers for controlling the drive for said pump means.

12. A system and apparatus according to claim 11, comprising means for periodically operatively interconnecting said motor with said control device.

13. A system and apparatus according to claim 11, comprising operating means responsive to emptying of said vessel for feeding liquid thereinto.

14. A system and apparatus according to claim 13, wherein said operating means comprises means for setting the tap of said first voltage divider as a function of the weight of the amount of liquid in said vessel to dispose said tap upon emptying said vessel to a desired level at a predetermined position, contact means operated by said tap in said predetermined position for closing a circuit for the operation of an electromagnetic valve disposed therein, said valve causing replenishing liquid to be fed to said vessel, means operative during the feeding of replenishing liquid to said vessel for returning said tap of said voltage divider to its initial position, and further contact means controlled by said tap in its initial position to interrupt said circuit so as to restore said electromagnetic valve to normal.

References Cited in the file of this patent

UNITED STATES PATENTS 2,072,442    Collins                Mar. 2, 1937